United States Patent
Saliba

(10) Patent No.: US 12,511,184 B1
(45) Date of Patent: Dec. 30, 2025

(54) METHOD AND SYSTEM FOR DIAGNOSING TAPE CARTRIDGE AND TAPE DRIVE ERRORS AT A CUSTOMER SITE AND A TAPE CARTRIDGE USED THEREIN

(71) Applicant: MagStor Inc., Columbus, OH (US)

(72) Inventor: George A. Saliba, Boulder, CO (US)

(73) Assignee: MagStor Inc., Columbus, OH (US)

( * ) Notice: Subject to any disclaimer, the term of this patent is extended or adjusted under 35 U.S.C. 154(b) by 33 days.

(21) Appl. No.: 18/199,962

(22) Filed: May 21, 2023

Related U.S. Application Data

(60) Provisional application No. 63/344,570, filed on May 21, 2022.

(51) Int. Cl.
| | |
|---|---|
| *G06F 11/07* | (2006.01) |
| *G06F 3/06* | (2006.01) |
| *G06F 11/30* | (2006.01) |
| *G11B 5/008* | (2006.01) |

(52) U.S. Cl.
CPC .......... *G06F 11/079* (2013.01); *G06F 3/0619* (2013.01); *G06F 3/0653* (2013.01); *G06F 3/068* (2013.01); *G06F 11/0727* (2013.01); *G06F 11/3034* (2013.01); *G11B 5/00813* (2013.01)

(58) Field of Classification Search
CPC .............. G06F 11/079; G06F 11/0727; G06F 11/3034; G06F 3/0653; G11B 20/1816; G11B 2020/1826; G11B 2220/90
See application file for complete search history.

(56) References Cited

U.S. PATENT DOCUMENTS

| | | | | |
|---|---|---|---|---|
| 5,576,905 A * | 11/1996 | Garcia | ................... | G11B 15/54 360/73.14 |
| 8,355,219 B2 | 1/2013 | Saliba | | |
| 10,453,485 B1 * | 10/2019 | Miyamura | ........... | G11B 5/5504 |
| 11,200,194 B1 | 12/2021 | Mindlin | | |
| 11,887,625 B1 | 1/2024 | Saliba | | |
| 11,892,961 B1 | 2/2024 | Mindlin | | |
| 2003/0235098 A1 * | 12/2003 | Chiba | .............. | G11B 20/10009 365/201 |
| 2006/0119962 A1 * | 6/2006 | Bentley | ................ | G11B 5/4555 |
| 2008/0010519 A1 * | 1/2008 | Beyer | ................... | G06F 11/326 714/21 |
| 2009/0059428 A1 * | 3/2009 | Kientz | ..................... | G11B 5/54 360/134 |

(Continued)

*Primary Examiner* — Yolanda L Wilson
(74) *Attorney, Agent, or Firm* — The Law Office of Patrick F. O'Reilly III, LLC

(57) ABSTRACT

A method and system for diagnosing tape cartridge and tape drive errors at a customer site and a tape cartridge used in the method and the system is disclosed herein. The tape cartridge includes a cartridge housing; a cartridge reel that is rotatably secured to the cartridge housing; tape media that is secured to the cartridge reel; and non-volatile cartridge memory comprising initial calibrated tape cartridge error data stored thereon, the initial calibrated tape cartridge error data comprising error information for a new state of the tape cartridge prior to the tape cartridge being used in an end-user tape drive so that subsequent errors associated with the tape cartridge and/or the end-user tape drive are able to be compared with the initial calibrated tape cartridge error data to determine whether the subsequent errors are associated with the tape cartridge, the end-user tape drive, or both the cartridge and the drive.

9 Claims, 5 Drawing Sheets

(56) References Cited

U.S. PATENT DOCUMENTS

2009/0109566 A1\* 4/2009 Tanaka .................. G11B 5/584
2019/0318798 A1\* 10/2019 Frolikov ............. G06F 11/0793
2021/0141531 A1\* 5/2021 Kim ..................... G06F 3/0619
2023/0004456 A1\* 1/2023 Bernat ................. G06F 3/0659

\* cited by examiner

METHOD AND SYSTEM FOR DIAGNOSING TAPE CARTRIDGE AND TAPE DRIVE ERRORS AT A CUSTOMER SITE AND A TAPE CARTRIDGE USED THEREIN

CROSS-REFERENCE TO RELATED APPLICATIONS

This patent application claims priority to, and incorporates by reference in its entirety, U.S. Provisional Patent Application No. 63/344,570, entitled "Method And System For Diagnosing Tape Cartridge And Tape Drive Errors At A Customer Site And A Tape Cartridge Used Therein", filed on May 21, 2022.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a method and system for diagnosing tape cartridge and tape drive errors at a customer site and a tape cartridge used in the method and the system. More particularly, the invention relates to a method and system to deterministically diagnose tape drive/cartridge degradation by storing the initial tape errors in the cartridge memory (CM) and running ongoing comparison(s) of subsequent drive/media error changes with the original calibrated data errors.

2. Background and Description of Related Art

Magnetic storage devices remain a viable solution for the storage and retrieval of large amounts of data. The use of magnetic tape cartridges, e.g., such as half-inch digital linear tape ("DLT"), linear tape open ("LTO") and helical scan tapes formats, such as 4 mm ("DAT", "8 mm") are well known in the art. Tape cartridges can store a vast amount of data. Tape drives can be used either singly as a standalone tape drive or in a tape library (also referred to as a media library).

Generally, each tape drive includes multiple recording and reproducing transducers to write and/or read data to the tape cartridges. Typical modern tape drives use thin film magnetoresistive (MR) head or ferrite core transducers to read and/or write data to the tape cartridges and are commonly referred to as tape heads. Magnetic storage devices are generally read/write capable and may be erased and written over many times during their lifetime.

For proper operation of the tape drive and to be able to record and reproduce data from the tape with acceptable data errors, the head must maintain very close proximity to the storage tape of the tape cartridge in order to provide the ability to record and reproduce signals. The head operates in an open environment and can be exposed to various contaminants from the open air and/or from the storage tape itself. Today's heads require very low separation between the head and the storage tape for greater accuracy in reading and writing of data. Excessive separation between the head and the storage tape and/or sensor damage such as scratches, nicks or other abrasions to the head itself can result in reading and writing errors or even head failure.

It is well known that tape to head separation increases when contaminants build up on the surface of the head. Cleaning cartridges or brushes can be used to remove contaminants. Unfortunately, these types of cleaning devices can be relatively ineffective for removing hardened deposits on the head. Further, when the sensor of the head is impacted with sufficient force, or when a conductive material causes a short in an element in the head, the head is rendered unusable and the drive must be repaired. In addition, contaminants and tape abrasive materials can generate surface scratches that effectively create permanent separation between the tape and the sensor. These defects will also reduce the head signal, requiring repair to the head.

Tapes are made of flexible basefilm such as PEN, PET or Poly-Aramid. The basefilm is coated with a very thin magnetic recording layer where the data is recorded. It is also well known that during normal operations, tapes degrade and lose their recording properties with repeated use of the same tape due to surface scratches caused by the running of the tape at close contact with the head. Furthermore, airborne contaminants deposited on the tape can cause tape surface damage such as scratches, nicks or other abrasions. Deposits, contaminants, or abrasions on the tape surface can result in reading and writing errors or even drive failure.

Presently, the drive diagnosis is lengthy, complex and costly. For example, when a tape drive fails within a media library, it is not possible to determine with certainty if the cause of the failure is marginal head or tape as both can produce data errors. In the case where multiple drives record data on the same cartridge, then it is virtually impossible to determine the marginal drive that caused the error, especially when the failure is compounded by a combination of the marginal heads and marginal media. Therefore, measuring the drive error rate is not a reliable method in identifying the marginal defective head.

A common current practice in the tape industry is to ship the suspect drives back to the factory for extensive testing where the drives are disassembled and the suspect heads are carefully removed from the drives. Suspect heads are returned to the head vendors for test and possible repair. The head repair procedure can be proprietary to each head vendor, further complicating the entire head test process. Typically, nearly half of the drives returned by customers with suspected failure are found to have no problem and the failure was likely caused by marginal or defective media in the field. The current process consists of a complete and costly retest at the factory without the need for actual repair, the drive is returned so that it can be reinstalled for the customer.

Also, other conventional methods in the tape industry attempt to track errors based on statistics or drive tracking, which also are typically ineffective and fail to solve the problem.

Accordingly, methods and systems to determine with certainty the cause of data failures in the field, as caused by marginal head or media, and the need to eliminate the requirement for the costly and extensive factory diagnosis and associated head removals and tests, are highly desired. Also, methods and systems are needed to deterministically test tape drives and media at a customer site without altering the normal operations of the customer.

BRIEF SUMMARY OF EMBODIMENTS OF THE INVENTION

Accordingly, the present invention is directed to a method and system for diagnosing tape cartridge and tape drive errors at a customer site and a tape cartridge used therein that substantially obviates one or more problems resulting from the limitations and deficiencies of the related art.

In accordance with one or more embodiments of the present invention, there is provided a system for diagnosing tape cartridge and tape drive errors. The system comprises a tape drive including a tape transport assembly and a tape head, the tape transport assembly configured to displace tape media in the tape drive, and the tape head configured to perform read-write operations on the tape media; and a tape cartridge including a cartridge housing, a cartridge reel that is rotatably secured to the cartridge housing, tape media that is secured to the cartridge reel, and non-volatile cartridge memory, the non-volatile cartridge memory comprising initial calibrated tape cartridge error data stored thereon, the initial calibrated tape cartridge error data comprising error information for a new state of the tape cartridge prior to the tape cartridge being used in the tape drive so that subsequent errors associated with the tape cartridge and/or the tape drive are able to be compared with the initial calibrated tape cartridge error data to determine whether the subsequent errors are associated with the tape cartridge, the tape drive, or both the tape cartridge and the tape drive.

In a further embodiment of the present invention, the initial calibrated tape cartridge error data is written and stored in the non-volatile cartridge memory at a factory site where the tape cartridge is made or a testing site where the tape cartridge is tested, and the tape drive is located at a customer site where the tape cartridge is used for end-user applications.

In yet a further embodiment, the initial calibrated tape cartridge error data stored in the non-volatile cartridge memory comprises normalized tape cartridge error data that is normalized by dividing total tape cartridge data by total tape cartridge errors to obtain a first value, and then dividing the first value by an integer to obtain a normalized tape cartridge error value.

In accordance with one or more other embodiments of the present invention, there is provided a tape cartridge for diagnosing tape cartridge and tape drive errors. The tape cartridge comprises a cartridge housing; a cartridge reel that is rotatably secured to the cartridge housing; tape media that is secured to the cartridge reel; and non-volatile cartridge memory, the non-volatile cartridge memory comprising initial calibrated tape cartridge error data stored thereon, the initial calibrated tape cartridge error data comprising error information for a new state of the tape cartridge prior to the tape cartridge being used in an end-user tape drive so that subsequent errors associated with the tape cartridge and/or the end-user tape drive are able to be compared with the initial calibrated tape cartridge error data to determine whether the subsequent errors are associated with the tape cartridge, the end-user tape drive, or both the tape cartridge and the end-user tape drive.

In a further embodiment of the present invention, the initial calibrated tape cartridge error data is written and stored in the non-volatile cartridge memory at a factory site where the tape cartridge is made or a testing site where the tape cartridge is tested, and the end-user tape drive is located at a customer site where the tape cartridge is used for end-user applications.

In yet a further embodiment, the initial calibrated tape cartridge error data stored in the non-volatile cartridge memory comprises normalized tape cartridge error data that is normalized by dividing total tape cartridge data by total tape cartridge errors to obtain a first value, and then dividing the first value by an integer to obtain a normalized tape cartridge error value.

In accordance with yet one or more other embodiments of the present invention, there is provided a method for diagnosing tape cartridge and tape drive errors. The method comprises the steps of: (i) formatting a new tape cartridge at a first location, the tape cartridge including cartridge memory; (ii) collecting initial tape cartridge error data, and storing the initial tape cartridge error data in the cartridge memory of the tape cartridge at the first location; (iii) writing and/or reading data on the tape cartridge using a tape drive at a second location; (iv) collecting subsequent tape cartridge error data at the second location; (v) reading the cartridge memory of the tape cartridge using the tape drive, and comparing subsequent tape cartridge error data collected at the second location to the initial tape cartridge error data stored in the cartridge memory; (vi) determining whether the subsequent tape cartridge error data collected at the second location is within acceptable limits of the initial tape cartridge error data stored in the cartridge memory; (vii) when the subsequent tape cartridge error data is not within acceptable limits of the initial tape cartridge error data, generate a warning indicating that a diagnostic test needs to be performed; and (viii) when the subsequent tape cartridge error data is within acceptable limits of the initial tape cartridge error data, generate an indicator that the tape cartridge is acceptable for use.

In a further embodiment of the present invention, the first location is at a factory site where the tape cartridge is made or a testing site where the tape cartridge is tested, and the second location is at a customer site where the tape cartridge is used for end-user applications.

In yet a further embodiment, prior to the step of storing the initial tape cartridge errors in the cartridge memory of the tape cartridge at the first location, the method further comprises the step of: (ix) normalizing the initial tape cartridge error data by dividing total tape cartridge data by total tape cartridge errors to obtain a first value, and then dividing the first value by an integer to obtain a normalized tape cartridge error value.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

In accordance with one or more illustrative embodiments, a method and system is disclosed herein for measuring the tape cartridge media performance and error rates when the media is new, and then storing the data in the non-volatile cartridge memory (CM). During normal operation, the system reads the original data from the memory of the tape cartridge and compares it with the current error rate and performance of the drive/media while the customer is performing normal operations. If the ratio between the original error rate and current error rate exceeds a preset limit, the system informs the customer to perform additional diagnostic tests on the drive or retire the tape media. In these one or more illustrative embodiments, the errors stored in the cartridge memory are not induced. Rather, natural errors on the cartridge tape are simply read so as to eliminate tape-to-tape variability and uncertainty. Advantageously, data is stored in the cartridge memory so as to travel with the tape. The cartridge memory contains original tape errors so that the diagnostics can be done at the customer site without disrupting the normal reading or writing of the data operations to the tape, and thus not requiring remote system connectivity and tracking. Advantageously, the methods and systems described herein deterministically test tape drives and media at a customer site without altering the normal operations of the customer.

Figure 1:
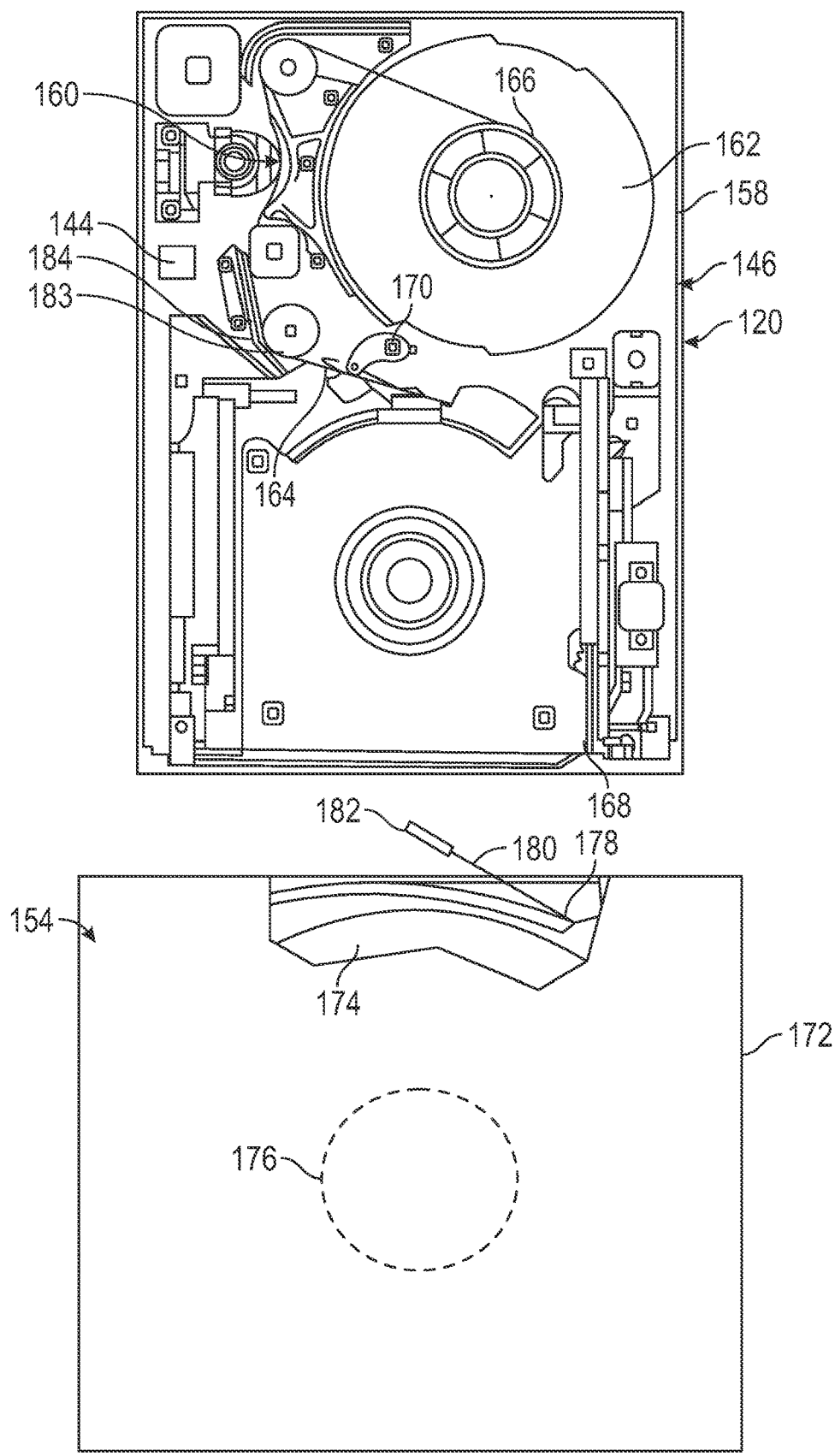
FIG. 1 is a top view of a tape drive and a tape cartridge, according to an illustrative embodiment of the invention.

FIG. 1 illustrates one illustrative embodiment of a cartridge 154 and the tape drive assembly 120, which includes one tape drive 146. It is recognized that the tape drive assembly 120 described herein can be part of a media library, or the tape drive assembly 120 can be a stand-alone type of assembly. The media library may be as described in U.S. Pat. No. 8,355,219, the entire disclosure of which is incorporated herein by reference.

In the embodiment illustrated in FIG. 1, the tape drive 146 includes a drive housing 158, a tape head 160, a take-up reel 162 having a drive leader 164 and a take-up reel hub 166, a cartridge receiver 168, a buckler 170 and the controller 144. In one embodiment, the tape cartridge 154 includes a cartridge housing 172, a cartridge reel 174 having a cartridge hub 176 (shown in dashed lines), a tape 178, and a cartridge leader 180 having a cartridge buckle component 182. The buckler 170 secures the drive leader 164 to the cartridge leader 180. The buckler 170 moves the drive leader 164 relative to the cartridge leader 180 to automatically buckle and/or unbuckle the drive leader 164 to the cartridge leader 180 in ways known to those skilled in the art. Further, the specific type of buckler 170 included in the tape drive assembly 120 can include any type of device that secures the drive leader 164 to the cartridge leader 180, and can be varied in ways known to those skilled in the art.

The drive housing 158 retains the various components of the tape drive 146, including at least the tape head 160 and the cartridge receiver 168. In the embodiment illustrated in FIG. 1, the tape drive 146 further includes a plurality of tape rollers 183 and tape guides 184 which are coupled or directly secured to the drive housing 158. The tape rollers 183 and tape guides 184 guide the tape 178 along a tape path across the tape head 160 and onto the take-up reel 162. In one embodiment, the tape drive 146 includes three tape rollers 183 and two tape guides 184. However, any suitable number of tape rollers 183 and/or tape guides 184 can be included in the tape drive 146.

The tape 178 is secured to the cartridge hub 176 on one end and the cartridge leader 180 on the other end. As illustrated in FIG. 1, the cartridge 154 includes a single cartridge reel 174. In an alternate embodiment (not shown), the cartridge 154 can include two or more cartridge reels 174. In the illustrative embodiment, the tape cartridge 154 includes solid state non-volatile cartridge memory (CM) in the form of a chip disposed inside the cartridge 154.

In this embodiment, the tape drive 146 also includes a take-up reel motor (not shown) that rotates the take-up reel 162, and a cartridge reel motor (not shown) that rotates the cartridge reel 174. The rotational force of the take-up reel motor relative to the cartridge reel motor determines the tension of the tape 178 moving across the tape head 160. In certain embodiments, the controller 144 dynamically controls the rotational force of the take-up reel motor and the cartridge reel motor to dynamically control the tension of the tape 178 relative to the tape head 160. In alternative embodiments, the tension of the tape 178 can also or alternatively be controlled by the controller 144 in other suitable ways, such as by controlled movement of the tape head 160 toward and/or away from the tape 178, or vice versa.

In one embodiment, the tape 178 of one of the cartridges 154 includes a storage tape only, which magnetically stores data in digital form.

In the illustrative embodiment, during the tape formatting phase, a reference drive, such as a new drive or a drive with a known low error rate, as verified by using multiple low error new cartridges, is selected to format the test cartridge. The process is similar to standard data writing with the limitation that the data must be written and read by at least every head transducer. For linear tape, the data must be written in both directions.

Now, the major operations performed in conjunction with illustrative tape cartridge and tape drive error diagnostic process will be described with reference to FIGS. 2-5. Initially, with reference to the flowchart of FIG. 2, an illustrative formatting and data error writing process for a blank tape cartridge will be explained. The media formatting and error storing process described in FIG. 2 may be performed at the tape cartridge factory or a testing site where the tape cartridge is tested. The variability from media to media is determined by the aforedescribed process. Beginning with step 202 in FIG. 2, a new LTO tape cartridge is loaded in a tape drive. Then, in step 204, data is written to a zone "x" of the LTO tape cartridge (i.e., data is written in succession to zone 1, zone 2, zone 3, etc.). In decision block 206, it is determined if the data was successfully written to zone "x" of the LTO tape cartridge. If the data was not written successfully to zone "x", then the tape drive or tape cartridge is required to be changed. Otherwise, if the data was written successfully to zone "x", then the process proceeds to step 208, where data and errors are collected (e.g., a particular quantity of errors per foot of tape). The data errors occur during read/write operations in either the forward or reverse direction of the tape as described hereinafter. Then, in step 210 of FIG. 2, the data/errors are normalized to "n". In the illustrative embodiment, the normalization is performed by dividing the total data by the total errors, and then dividing by a number (e.g., an integer, such as the number 3). Advantageously, the normalization of the data/errors makes the numbers more linear. After which, continuing with the process of FIG. 2, the normalized data is stored to the non-volatile cartridge memory (CM) in step 212. In the illustrative process, steps 210 and 212 only occur during the formatting of the tape cartridge. With continued reference to FIG. 2, in decision block 214, it is determined if the data has been stored to the cartridge memory. If the data was not stored to the cartridge memory, then the tape cartridge needs to be replaced. Otherwise, if the data was stored to the cartridge memory, then the process proceeds to step 216, where the steps are performed for the next zone of the tape cartridge. Then, in decision block 218, it is determined if the last zone of the tape cartridge has been reached. If the last zone of the tape cartridge has not been reached, then process reverts back to step 204, where the data is written to the next zone of the tape cartridge. Otherwise, if the last zone of the tape cartridge has been reached, then the tape cartridge calibration test is performed in step 220 (as will be described in conjunction with FIG. 3 hereinafter).

Now, with reference to the flowchart of FIG. 3, an illustrative tape cartridge calibration test will be described. Initially, in step 230 of FIG. 3, the formatted cartridge is inserted into the tape drive, and in step 232, zone "x" of the tape cartridge is read for errors so that the errors are able to be collected (i.e., zones are read in succession, e.g., beginning with zone 1, zone 2, zone 3, etc.). In decision block 234, it is determined if the tape cartridge was read successfully. If the tape cartridge was not read successfully, then the tape cartridge is rejected. Otherwise, if the tape cartridge was read successfully, then the process proceeds to step 236, where data is collected. Then, in step 238, the data/errors are normalized to "n". After which, the normalized data is stored to the cartridge memory (CM) in step 240. After step 240, in decision block 242, it is determined if the last read zone of the tape cartridge was reached. If the last zone of the tape cartridge has not been read, then the process reverts back to step 232, where the next zone of the tape cartridge is read to collect errors. Otherwise, if the last zone of the tape cartridge has been read, then the process proceeds to step 244, where data is written after formatted data (AFD) for the reverse direction of the tape cartridge. Then, in step 246, the write errors are collected for the reverse direction of the tape cartridge. After which, in step 248, the normalized data is stored to the cartridge memory (CM). In decision block 250, it is determined if forward write data is detected on the tape cartridge. If forward write data is not detected on the tape cartridge, then the process reverts back to step 244, where data is written after formatted data (AFD) for the reverse direction of the tape cartridge. In an alternative embodiment, if forward write data is not detected on the tape cartridge in step 250, then the process of FIG. 3 ends. Otherwise, if forward write data is detected on the tape cartridge, then data is written after formatted data (AFD) for the forward direction of the tape cartridge in step 254. Then, in step 256, the write errors are collected for the forward direction of the tape cartridge. After which, in step 258, the normalized data is stored to the cartridge memory (CM).

Figure 2:
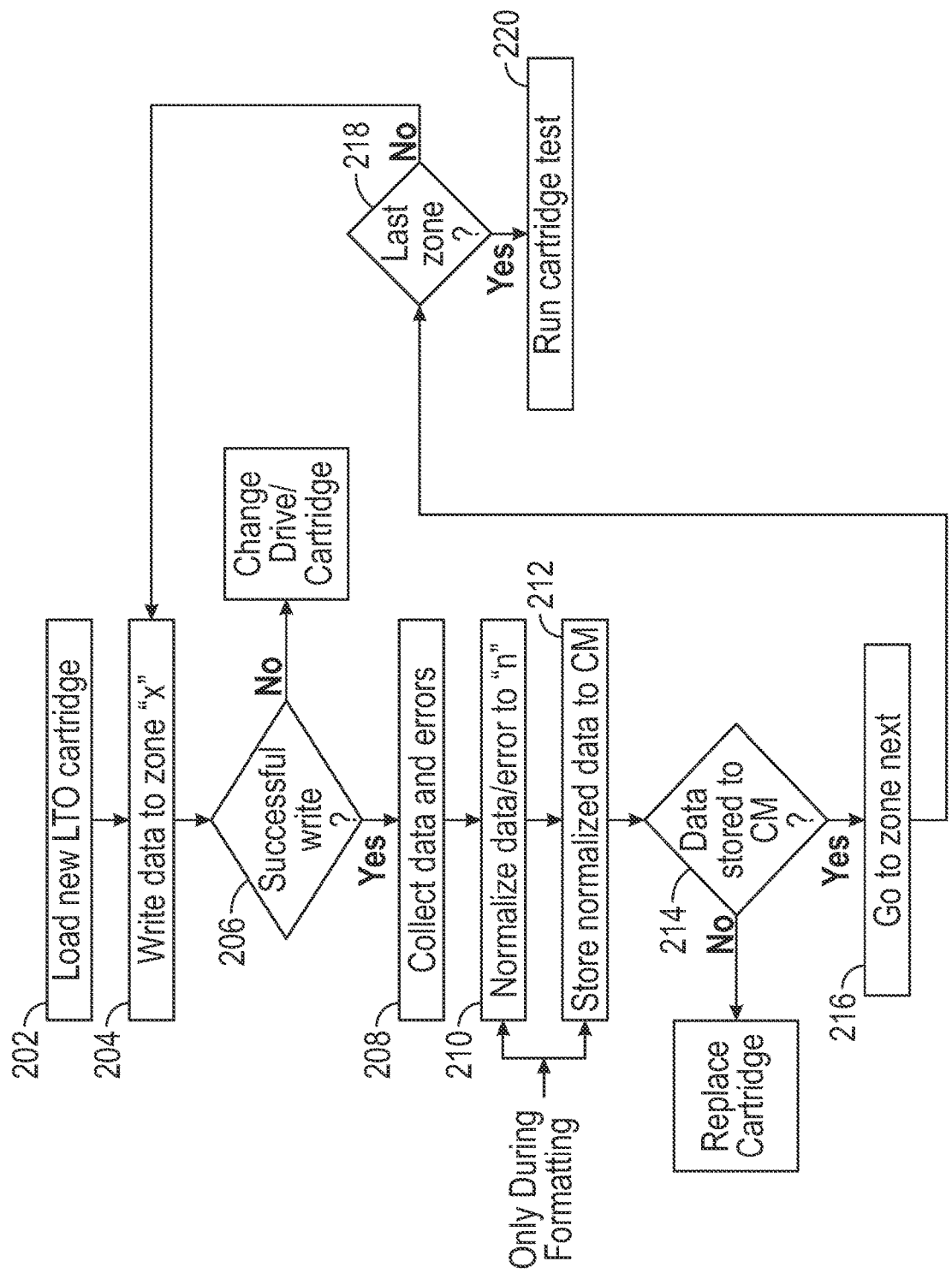
FIG. 2 is a flowchart illustrating an initial formatting and data error writing process for a blank tape cartridge, according to the illustrative embodiment of the invention.
Figure 3:
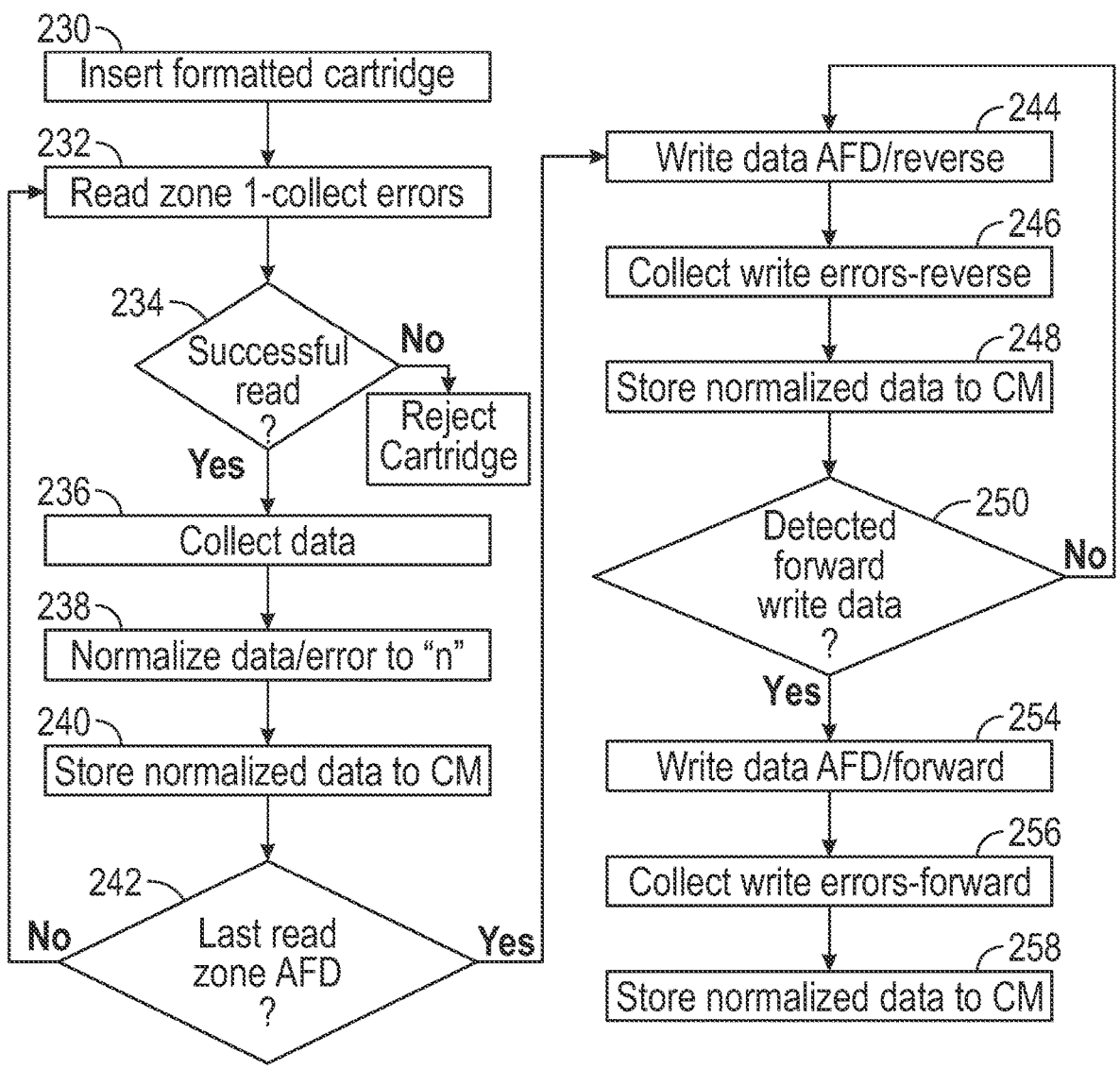
FIG. 3 is a flowchart illustrating a tape cartridge calibration test, according to the illustrative embodiment of the invention.

In one illustrative embodiment, the functionality described in the flowcharts of FIGS. 2 and 3 may be performed by host software at the factory or testing facility, also known as an independent software vendor (ISV) application, which reads the errors from the tape drive and does the storage, management, and normalization. In another illustrative embodiment, a tape library or tape drive itself can perform the functionality described in the flowcharts of FIGS. 2 and 3 (e.g., a controller of the tape library or tape drive).

Next, with reference to the flowchart of FIG. 4, an illustrative tape cartridge diagnostic test will be explained. The tape cartridge diagnostic test is done after the formatting of the tape cartridge, and anytime to determine if the tape drive or tape media is defective. Initially, in step 260 of FIG. 4, the formatted cartridge is inserted into the tape drive, and in step 262, zone "x" of the tape cartridge is read for errors so that the errors are able to be collected (i.e., zones are read in succession, e.g., beginning with zone 1, zone 2, zone 3, etc.). In decision block 264, it is determined if the tape cartridge was read successfully. If the tape cartridge was not read successfully, then the tape cartridge is rejected. Otherwise, if the tape cartridge was read successfully, then the process proceeds to step 266, where data is collected. Then, in step 268, the data/errors are normalized to "n". After which, the normalized data is stored to the cartridge memory in step 270. In the illustrative process, steps 268 and 270 only occur during the formatting of the tape cartridge. After step 270, in decision block 272, it is determined if the last read zone after formatted data (AFD) of the tape cartridge was reached. If the last zone of the tape cartridge has not been read, then the process reverts back to step 262, where the next zone of the tape cartridge is read to collect errors. Otherwise, if the last zone of the tape cartridge has been read, then the process proceeds to step 274, where data is written after formatted data (AFD) for the reverse direction of the tape cartridge. Then, in step 276, the write errors are collected for the reverse direction of the tape cartridge. After which, in step 278, the normalized data is stored to the cartridge memory (CM). In decision block 279, it is determined if forward write data is detected on the tape cartridge. If forward write data is not detected on the tape cartridge, then the process reverts back to step 274, where data is written after formatted data for the reverse direction of the tape cartridge. In an alternative embodiment, if forward write data is not detected on the tape cartridge in step 279, then the process proceeds to block 286. Otherwise, if forward write data is detected on the tape cartridge, then data is written after formatted data for the forward direction of the tape cartridge in step 280. Then, in step 282, the write errors are collected for the forward direction of the tape cartridge. After which, in step 284, the normalized data is stored to the cartridge memory (CM). In block 286, the tape cartridge write and read normalized results are compared with a limit. If the cartridge test results fail to satisfy the specified limit, then the tape drive is defective and must be replaced. Otherwise, if the cartridge test results satisfy or pass the specified limit, then the suspect tape cartridge is replaced. In other words, in block 286, it is determined whether the excessive errors result from the tape cartridge or the tape drive.

Figure 4:
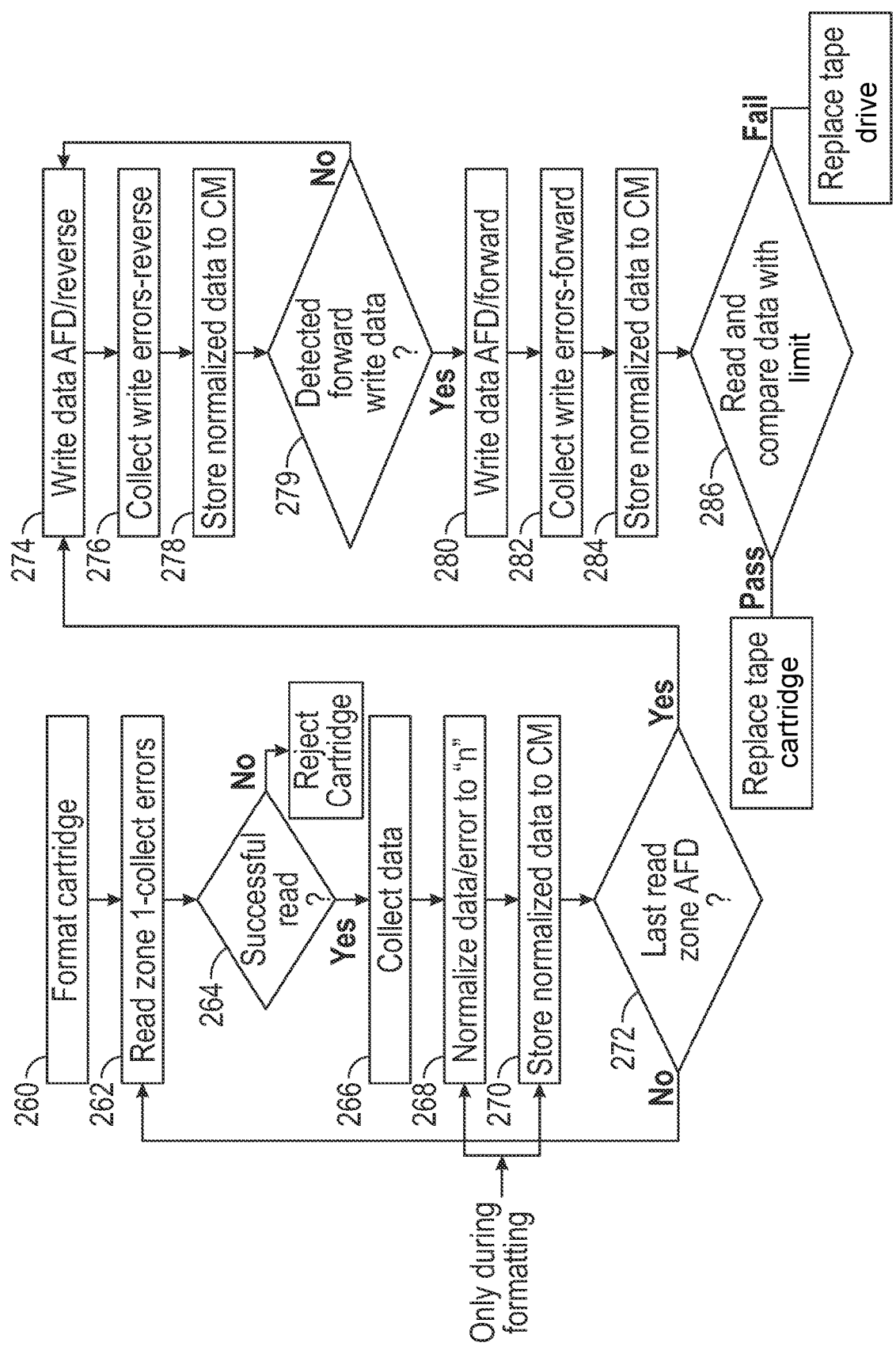
FIG. 4 is a flowchart illustrating a tape cartridge diagnostic test, according to the illustrative embodiment of the invention.

The diagnostic test of FIG. 4 is performed when a problem has been detected, which could be caused by a suspect cartridge, a suspect tape drive, or a combination thereof. In performing the diagnostic test, a known "good" reference cartridge is used to test the suspect tape drive. As such, the ability to read pre-written data is tested and then new data is written and read. After the data is normalized and compared to a limit, then it can be determined with certainty whether the tape drive or the suspect tape cartridge is the cause. So, if the suspect tape drive fails to meet the limits with a known "good" reference cartridge, then the drive is the cause of the failure and must be sent for repair. If the tape drive passes the limit of the diagnostic test of FIG. 4, then the customer original suspect tape cartridge is the cause of the failure, and that tape cartridge must be retired, and the tape drive can be reinstated back to operations.

Finally, with reference to the flowchart of FIG. 5, an illustrative tape cartridge customer process will be described. In general, during the customer process, the data and errors of the customer normal work are collected, normalized and compared to the data stored in cartridge memory (CM). Initially, in step 300 of FIG. 5, data is read or written on the tape cartridge by the tape drive of the customer. Then, in step 302, errors from the tape cartridge are collected. After which, in step 304, the data/errors are normalized to "n". Next, in step 306, the cartridge memory (CM) is read and the data is compared. After step 306, in decision block 308, it is determined if the errors of the tape cartridge are within the acceptable limits. If the errors of the tape cartridge are not within the acceptable limits, then the customer is given a warning to run the tape cartridge diagnostic test of FIG. 4. Otherwise, if the errors of the tape cartridge are within the acceptable limits, then the tape cartridge is considered safe to use in step 310, and the process continues. After step 310, in decision block 312, it is determined if the tape cartridge comprises new media. If it is determined that the tape cartridge comprises new media, then the process is done at step 314. Otherwise, if it is determined at decision block 312 that the tape cartridge does not comprise new media, then the process reverts back to step 300, where data is read or written on the tape cartridge by the tape drive of the customer. Advantageously, the processes described in the illustrative embodiment herein allow the diagnostics to be done at the customer site without disrupting the normal reading or writing of the data operation to the tape, and thus not requiring remote system connectivity and tracking.

Figure 5:
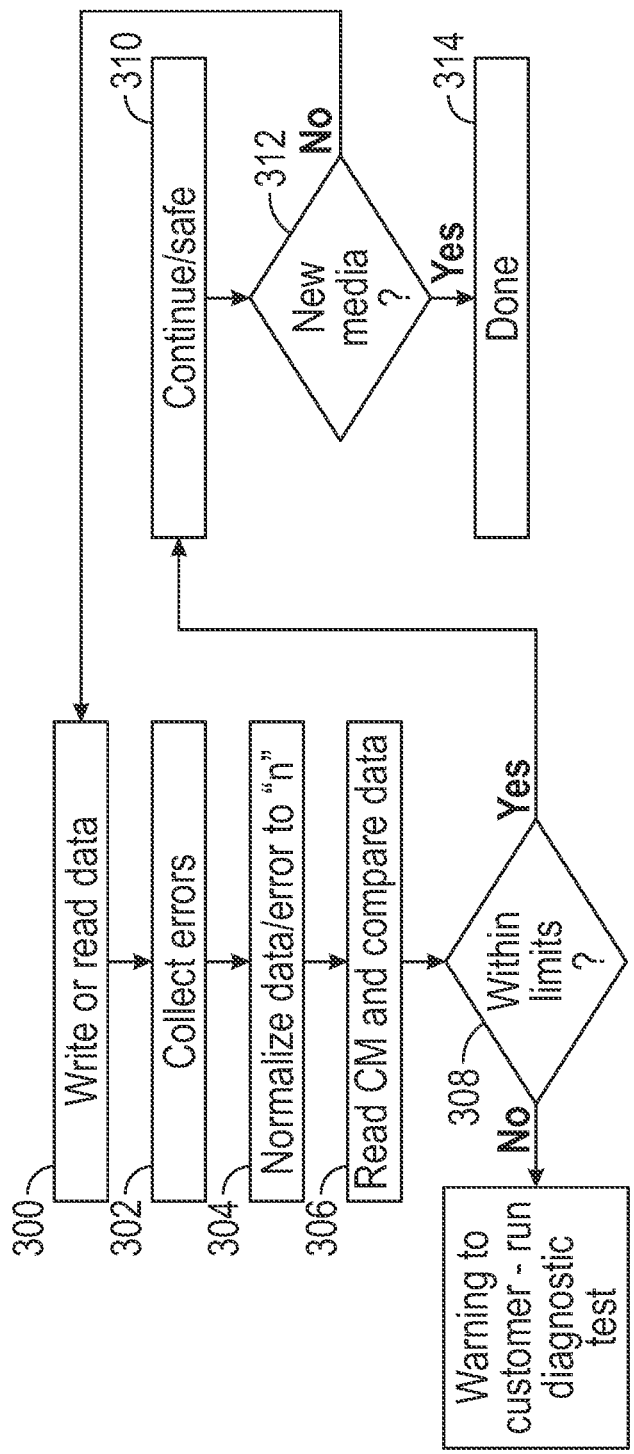
FIG. 5 is a flowchart illustrating a tape cartridge customer process, according to the illustrative embodiment of the invention.

In one illustrative embodiment, the functionality described in the flowcharts of FIGS. 4 and 5 may be performed by host software of the customer, also known as an independent software vendor (ISV) application, that reads the errors from the tape drive and does the comparison and management. In another illustrative embodiment, a customer tape library or customer tape drive itself can perform the functionality described in the flowcharts of FIGS. 4 and 5 (e.g., a controller of the tape library or tape drive).

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A system for diagnosing tape cartridge and tape drive errors, the system comprising:
   a tape drive including a tape transport assembly and a tape head, the tape transport assembly configured to displace tape media in the tape drive, and the tape head configured to perform read-write operations on the tape media; and
   a tape cartridge including a cartridge housing, a cartridge reel that is rotatably secured to the cartridge housing, tape media that is secured to the cartridge reel, and non-volatile cartridge memory, the tape media comprising a plurality of successive zones, the non-volatile cartridge memory comprising initial calibrated tape cartridge error data stored thereon, the initial calibrated tape cartridge error data comprising error information for a new state of the tape cartridge prior to the tape cartridge being used in the tape drive so that subsequent errors associated with the tape cartridge and/or the tape drive are able to be compared with the initial calibrated tape cartridge error data to determine whether the subsequent errors are associated with the tape cartridge, the tape drive, or both the tape cartridge and the tape drive;
   wherein the initial calibrated tape cartridge error data comprises errors collected for one or more of the plurality of successive zones of the tape media; and
   wherein the initial calibrated tape cartridge error data stored in the non-volatile cartridge memory comprises normalized tape cartridge error data that is normalized by dividing total tape cartridge data by total tape cartridge errors to obtain a first value, and then dividing the first value by an integer to obtain a normalized tape cartridge error value.

2. The system according to claim 1, wherein the initial calibrated tape cartridge error data is written and stored in the non-volatile cartridge memory at a factory site where the tape a cartridge is made or a testing site where the tape cartridge is tested, and the tape drive is located at a customer site where the tape cartridge is used for end-user applications.

3. The system according to claim 1, wherein the tape media of the tape cartridge comprises a linear tape media.

4. A tape cartridge for diagnosing tape cartridge and tape drive errors, the tape cartridge comprising:
   a cartridge housing;
   a cartridge reel that is rotatably secured to the cartridge housing;
   tape media that is secured to the cartridge reel, the tape media comprising a plurality of successive zones; and
   non-volatile cartridge memory, the non-volatile cartridge memory comprising initial calibrated tape cartridge error data stored thereon, the initial calibrated tape cartridge error data comprising error information for a new state of the tape cartridge prior to the tape cartridge being used in an end-user tape drive so that subsequent errors associated with the tape cartridge and/or the end-user tape drive are able to be compared with the initial calibrated tape cartridge error data to determine whether the subsequent errors are associated with the tape cartridge, the end-user tape drive, or both the tape cartridge and the end-user tape drive;
   wherein the initial calibrated tape cartridge error data comprises errors collected for one or more of the plurality of successive zones of the tape media; and
   wherein the initial calibrated tape cartridge error data stored in the non-volatile cartridge memory comprises normalized tape cartridge error data that is normalized by dividing total tape cartridge data by total tape cartridge errors to obtain a first value, and then dividing the first value by an integer to obtain a normalized tape cartridge error value.

5. The tape cartridge according to claim 4, wherein the initial calibrated tape cartridge error data is written and stored in the non-volatile cartridge memory at a factory site where the tape cartridge is made or a testing site where the tape cartridge is tested, and the end-user tape drive is located at a customer site where the tape cartridge is used for end-user applications.

6. The tape cartridge according to claim 4, wherein the tape media of the tape cartridge comprises a linear tape media.

7. A method for diagnosing tape cartridge and tape drive errors, the method comprising the steps of:
    formatting a new tape cartridge at a first location, the tape cartridge including cartridge memory;
    collecting initial tape cartridge error data, and storing the initial tape cartridge error data in the cartridge memory of the tape cartridge at the first location;
    writing and/or reading data on the tape cartridge using a tape drive at a second location;
    collecting subsequent tape cartridge error data at the second location;
    reading the cartridge memory of the tape cartridge using the tape drive, and comparing subsequent tape cartridge error data collected at the second location to the initial tape cartridge error data stored in the cartridge memory;
    determining whether the subsequent tape cartridge error data collected at the second a location is within acceptable limits of the initial tape cartridge error data stored in the cartridge memory;
    when the subsequent tape cartridge error data is not within acceptable limits of the initial tape cartridge error data, generate a warning indicating that a diagnostic test needs to be performed; and
    when the subsequent tape cartridge error data is within acceptable limits of the initial tape cartridge error data, generate an indicator that the tape cartridge is acceptable for use.

8. The method according to claim 7, wherein the first location is at a factory site where the tape cartridge is made or a testing site where the tape cartridge is tested, and the second location is at a customer site where the tape cartridge is used for end-user applications.

9. The method according to claim 7, wherein, prior to the step of storing the initial tape cartridge errors in the cartridge memory of the tape cartridge at the first location, the method further comprises the step of:
    normalizing the initial tape cartridge error data by dividing total tape cartridge data by total tape cartridge errors to obtain a first value, and then dividing the first value by an integer to obtain a normalized tape cartridge error value.

* * * * *